United States Patent
Gordon et al.

[15] 3,654,446

[45] Apr. 4, 1972

[54] METHOD AND APPARATUS FOR THE MEASUREMENT AND DISPLAY OF ERROR VALUES OF PRECISION MACHINE TOOLS, ELECTRONIC INSTRUMENTS, ETC.

[72] Inventors: Gary B. Gordon, Cupertino; Jonathan D. Garman, Sunnyvale, both of Calif.

[73] Assignee: Hewlett-Packard Company, Palo Alto, Calif.

[22] Filed: Apr. 3, 1970

[21] Appl. No.: 25,520

[52] U.S. Cl...............235/151.3, 235/151.11, 235/151.32, 318/594, 340/347 DA
[51] Int. Cl. ........................G06f 15/46, H03k 13/02
[58] Field of Search................73/1 R, 1 E; 235/150.5, 151, 235/151.11, 151.3, 151.32; 318/567, 569, 592, 594, 606; 340/347 DA, 347 AD; 356/106 R

[56] References Cited

UNITED STATES PATENTS

| | | | |
|---|---|---|---|
| 3,551,656 | 12/1970 | Wohlfeil | 235/151.11 |
| 3,320,409 | 5/1967 | Larrowe | 235/150.5 X |
| 3,458,259 | 7/1969 | Bagley et al. | 356/106 |
| 2,924,768 | 2/1960 | Farrand et al. | 235/151.11 X |
| 3,327,101 | 6/1967 | Evans | 235/151.11 |
| 3,372,321 | 3/1968 | Inaba et al. | 235/151.11 X |
| 3,473,098 | 10/1969 | Waller | 235/151.11 X |
| 3,493,827 | 2/1970 | Tinkler | 318/594 |

Primary Examiner—Malcolm A. Morrison
Assistant Examiner—Jerry Smith
Attorney—Roland I. Griffin

[57] ABSTRACT

A system for measuring and plotting a sequence of error values, for example the positioning errors of machine tools as a function of distance along an axis of travel, the output frequency errors in voltage controlled oscillators, and the like is described. The system for positioning error plotting comprises a laser interferometer for measuring the actual distance of movement of the machine and a novel and simple calculator system including a pair of digital-to-analog converters coupled to the interferometer for determining from this laser interferometer measurement both the desired (or assumptive) distance of movement of the machine and the error distance between the actual distance and the desired distance. By assuming the desired position of the machine, complex interconnections to its controller are avoided. The calculated error distance and distance at which the error occurred are plotted on an X-Y recorder. A similar technique is described for the calibration of voltage controlled oscillators.

33 Claims, 3 Drawing Figures

INVENTORS
GARY B. GORDON
JONATHAN D. GARMAN

BY Roland D. Griffin

ATTORNEY

METHOD AND APPARATUS FOR THE MEASUREMENT AND DISPLAY OF ERROR VALUES OF PRECISION MACHINE TOOLS, ELECTRONIC INSTRUMENTS, ETC.

BACKGROUND OF THE INVENTION

The measurement and display of positioning errors are a matter of prime concern to the manufacturers and the users of precision machine tools, from micrometers to computer controlled drilling and milling machines. Graphic plotting of errors is extremely desirable, although presently too time consuming or expensive. Such a plot allows one to see a machine's accuracy behavior at a glance, in perspective. The procedure for accomplishing this, performed many times in succession, consists of first setting the machine tool to a desired distance along its axis of travel. This might be indicated, for example, by the machine's dial reading. Second, the actual distance of setting is measured. Next, the difference or error distance between the desired distance and the actual distance is computed. Finally, the error distance may be plotted on a suitable graph, such as an X-Y graph, with the desired distance along the abscissa and the error distance along the ordinate.

Performing this operation manually is a very tedious and time-consuming project. Techniques have been developed for performing these repetitive steps automatically. For example, in the case of a tape controlled milling machine, information relating to the desired distance is obtained from the program tape, the actual distance is measured by a precision distance measuring apparatus such as an interferometer, and these two measurements, for example in digital form, are fed to a calculator for performing the subtraction. This technique requires that an interconnection be made between the calculator and the control apparatus of the milling machine, and this interconnection is generally awkward and expensive, since such controls are not designed to transmit such information without additional interfacing circuitry. Also the coding of the data varies from one machine to the next. Further, the calculator needed to perform the calculations is complex and expensive. In other machines, such as small shop milling machines, the data does not even exist in electrical form, but rather it is carried on mechanical dials.

A similar problem is also encountered in precision electronic equipment, including the calibration of digital voltmeters and the generation of linearity curves for voltage controlled oscillators.

SUMMARY OF THE INVENTION

The present invention relates to a novel method and apparatus for determining and plotting errors in precision machines and instruments, including positioning errors in machine tools and linearity errors in electronic devices such as digital voltmeters and voltage controlled oscillators. This technique is more easily understood if one first assumes that the error is smaller than half the calibrating interval. The machine under calibration is then advanced through these chosen calibration distances. At each point the laser interferometer reads the actual position. Then the apparatus makes the assumption that the desired distance is the nearest allowable calibration distance to the actual distance. A novel method is employed to derive the desired distance and perform the subtraction. The result is automatic presentation of errors in graphic form, with substantial ease of use and reduction in cost. A simple interconnect with the machine serves merely to correlate the machine movement with the interferometer reading; no precision desired distance information in needed from the control circuitry of the machine.

The apparatus operates to make a measurement of the actual distance of movement of the machine at each one of a series of calibration intervals, for example, every one tenth or one hundredth of an inch.

Two digital-to-analog converters (DAC) are employed, one of which operates on the 10 inch, 1 inch, tenth inch, hundredths inch, and a portion of the thousandths inch digit readings from the interferometer to produce the assumptive distance reading. When the machine is at one of the calibration intervals, this system "assumes" that the assumptive distance of the machine is that which is the nearest hundredths inch in this example to the reading on the interferometer and produces an analog output value indicative of this position for the abscissa or X drive of the X-Y plotter. For example, with an interferometer reading of 03.99975 inch or 04.00025 in., the first DAC will produce an analog output value representing an assumptive distance of 4.00 in. for plotting along the abscissa.

The second digital-to-analog converter operates on the thousandths inch, ten thousandths inch, and hundred thousandths inch digit readings from the interferometer to produce an analog output value indicative of the error distance at each such interval for plotting along the ordinate. The error distance is obtained by subtraction by truncation, which requires that the calibration distance interval be chosen preferably greater than twice the maximum error expected. Since the expected error in precision machines is at the most in the order of several thousandths of an inch, the error distance will clearly fall within half the one hundredth inch distance calibration interval.

Since this system employs conventional digital-to-analog converters and simple auxiliary equipment, it is substantially less expensive than the complex interface equipment and arithmetic computers previously employed. A substantial saving in time in setting up and making the desired measurements is obtained since no complex interconnection with the machine tool control is necessary.

In addition to measuring machine tool positioning errors, this method and apparatus may be used with other measurement devices including calibrating digital voltmeters and producing linearity curves for voltage controlled oscillators.

DESCRIPTION OF THE PREFERRED EMBODIMENTS

Figure 1:
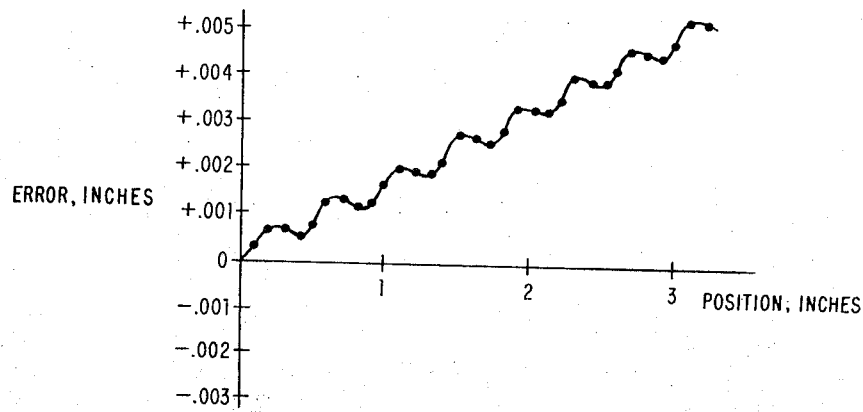
FIG. 1 is an X-Y plot of the positioning error of a machine tool plotted with a resolution of 0.00001 inch along the ordinate, the position of the machine being plotted in tenth inch intervals along the abscissa.

Referring to FIG. 1 there is shown a typical plot made on an X-Y plotter of the position errors along the distance of travel of a machine tool. The location of the machine is plotted in tenth inch increments along the abscissa or X-axis and the positioning error of the machine is plotted in hundred thousandths of an inch along the ordinate or Y-axis. The plot shows a cyclic error superimposed on a linear error, which could, for example, be found in a lead screw which was slightly too long and which wobbled as it rotated.

This curve may be plotted by hand by obtaining a sufficiently large number if data points on the graph, each point being determined by moving the machine drive to a desired position along its distance of travel, measuring the actual distance of travel by a precision interferometer, subtracting the two distances to obtain a position error, and plotting this error value along the ordinate at the desired distance along the abscissa.

Where the machine is computer controlled, the information relating to the desired position could be obtained from the controller with suitable interfacing and used to automatically control the X drive of the X-Y recorder. An arithmetic computer coupled to the interferometer and the controller may be used to calculate the error for plotting along the Y-axis.

Figure 2:
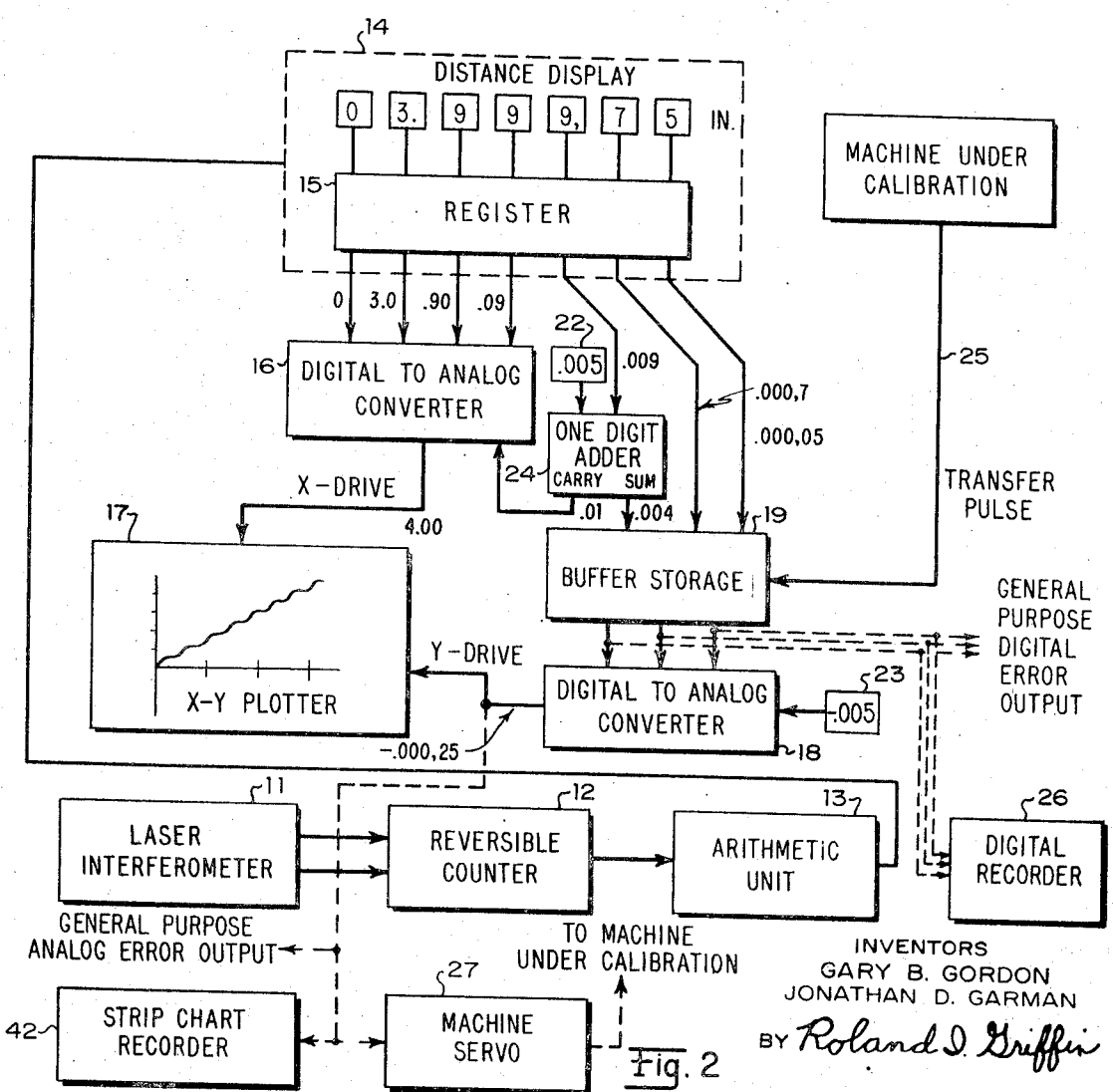
FIG. 2 is a block diagram of the novel calculator system utilizing digital coding and operating to produce both the ordinate and abscissa values for the X-Y positioning error plots.

Referring now to FIG. 2, there is shown a block diagram of a system which will automatically determine the error distance and the desired distance from the interferometer alone and feed this information to the X-Y recorder for plotting. This system performs without complex interfacing with the machine tool controller and without complex arithmetic computers.

This system comprises a precision distance measuring device such as a laser interferometer 11 of the type disclosed in U.S. Pat. No. 3,458,259 entitled INTERFEROMETRIC SYSTEM issued July 27, 1969, to A. S. Bagley, et al. The output of the interferometer comprises a constant reference frequency, $f_r$, and a doppler or comparison frequency, $f_c$, that varies from a center frequency equal to $f_r$ by a frequency proportional to the rate of change in distance of the machine tool drive measured by the interferometer. The two frequency outputs $f_r$ and $f_c$ are transmitted to a reversible counter 12, the output of the counter serving as a measure of the length change. For example, a one count in the counter represents a change in length of one quarter wavelength of light, or approximately 6$\mu$ inches. The contents of the counter are transmitted to an arithmetic unit 13 where they may be converted to length in inches or millimeters, and the digital output transmitted to a digital display 14. The measurement shown on the display is 03.99975 inches.

The 10s, units, 10ths and 100ths digits are transmitted from a register 15 in the digital display to a first digital-to-analog converter 16, the analog output serving as the X drive input for the X-Y recorder 17. The thousandths, ten thousandths and hundred thousandths digits are transmitted to a second digital-to-analog converter 18 via a buffer storage circuit 19. Before transmittal to the buffer storage, the thousandths digit is sent to a one digit adder 24 where it is added to a set value of 0.005 (function box 22); this value of 0.005 is later subtracted analogously (function box 23) as described below. In a less desirable embodiment of the invention, the addition of 0.005 by adder 24 can be replaced by the operation of mechanically offsetting the interferometer and machine by 0.005 in. This offset, however, renders the display 14 less readable.

The digital-to-analog converter 16 is utilized to determine the assumptive distance of movement of the machine under calibration without actually requiring assumptive distance information from the machine. The assumptive value is an integral multiple of the calibration interval, which itself is preferably larger than twice the error value. This is accomplished by transmitting the 10s, units, 10ths, and 100ths digits from the register 15 to the digital-to-analog converter 16 where the digital value represented by these digits is converted to an analog output signal proportional to an assumptive distance rounded off to the nearest 100ths digit. For example, for the reading shown in the digital display, i.e. 03.99975, the assumptive distance rounded off to the nearest 100ths digit is 4.00, and an analog output proportional to the assumptive distance 4.00 is utilized to drive the X drive of the X-Y recorder 17 along the X-axis to the position corresponding to the assumptive distance 4.00. The next lower assumptive distance would be 3.99 and the next higher assumptive distance would be 4.01.

This assumptive distance circuitry contains a decision path between the thousandths digit in the register 15 and the digital-to-analog converter 16 to convert the thousandths digits of 4 or less to a zero hundredths value and to convert the thousandths digits of 5 or more to a one hundredths value so that the hundredths reading may be rounded off to the nearest hundredths value. This will insure that errors negative in sign are not plotted one increment too low in position.

The positioning error value is obtained by subtraction by truncation. This makes it preferable that the calibration interval be chosen greater than twice the maximum error expected. If the error grows to greater than half of this calibration interval, there will be a discontinuity in the plot, but the results can still be interpreted so long as adjacent error points bear some recognizable correlation. A better solution is to widen the calibration interval.

In the present example, the error is derived as follows:
$$E = 3.99975 - 4.00000$$

Since in our example the machine axis is calibrated at 0.01 inch increments, it is noted that this calibration interval is substantially greater than the error measured and the subtrahend has zeros in the columns of interest in the minuend. Problems arising from sign change of the error are avoided by adding a fixed offset digitally by way of function box 22 to the thousandths digit transmitted to the buffer storage 19. In the example given, the thousandths digit 0.009 is added to 0.005 in our digit adder 24 to give 0.014; the hundredths digit (0.01) is sent to digital to analog converter 16, and the thousandths digit (0.004) is transferred to the buffer storage 19. The buffer storage will therefore contain a digital value of 0.00475. This digital value is transmitted to the digital-to-analog converter 18 where it is converted to an analog signal proportional thereto, this analog signal then having the offset of 0.005 of function box 23 subtracted analogously therefrom to give the position error distance of $-0.00025$. Removing the 0.005 offset centers a zero error on zero analog volts. If the voltage offset is tolerable then function box 23 may be left out. The analog output of the digital-to-analog converter 18 is proportional to this $-0.00025$ error distance and serves to drive the Y drive of the X-Y recorder 17 to this point along the Y-axis.

The mathematics of driving this error signal are as follows:

$E = 3.99975 - 4.00000$
$\phantom{E} = 3.99975 + 0.005 - 0.005 - 4.00000$
$\phantom{E} = 4.00475 - 4.00000 - 0.005$
$\phantom{E} = (4.00475 \text{ modulo } 0.01) - (0.005)$
$\phantom{E} = 0.00475 - 0.005$
$\phantom{E} = -0.00025$ Note that the minuend (4.00000) is derived by the assumption that it is the nearest hundredths integer to the subtrahend obtained from the laser interferometer. This is derived without requiring wiring into or complex interfacing with the machine control circuitry.

While the division of the number in the example given is between the hundredths and the thousandths digit, separation may be selected at other places as desired depending on the specific application and the results desired. Also, although the example given shows a resolution to 10$\mu$ inches, resolution to 1$\mu$ inch or greater is possible with laser interferometers and this system will plot error distances to the same degree that the laser interferometer can resolve the readings.

Further, scale changes are possible by varying the sensitivity of the X-Y recorder. Thus, the Y distance to represent a given error, and X distance to represent a given calibration point, can be chosen at will so as to best fill a piece of graph paper with the data.

Interconnection with the machine under calibration is a simple circuit such as a line 25 for transmitting trigger pulses to indicate to the buffer storage 19 that a calibration point has been reached. For example, a pulse received from the machine under calibration every time a calibration point is reached will trigger the buffer storage 19 to transmit the then recorded digital value to the digital-to-analog converter 18 to produce the Y drive analog output to the X-Y recorder 17. Thus, only a simple calibration point arrival signal is needed from the machine under calibration; no information relative to the desired position is necessary.

It should be noted that, rather than transmit an indication from the machine under calibration that each calibration interval is reached, control signals may be sent from the laser interferometer system to the machine under calibration to command it to move from one calibration interval to the next. For example, after a first error signal determination is made and recorded by the interferometer system, it will command the machine under calibration to move to the next calibration interval where the machine will stop and the error signal will be computed and recorded, after which the next command signal is given to the machine by the laser interferometer system.

A third method of control is to have the operator initiate the transfer pulses. For example, when calibrating a line scale, the operator might center a microscope reticule over each one of the scale's engraved marks, and then press a button to signal the apparatus to plot the error at each point. The interferometer in this case would be attached so as to measure the position of the microscope.

It should be noted that this assumptive distance method can also be used to generate a digital rather than analog indication of error. In some applications it might be preferable to record the error data in digital form, such as with a printer, a paper or magnetic tape recorder 26.

It should also be noted, that rather than plotting the analog output, it can be used as an error signal and fed back to a machine controller 27 to servo out the error. With this scheme it is necessary that the positions asked for be separated by greater than twice the maximum error expected.

Figure 3:
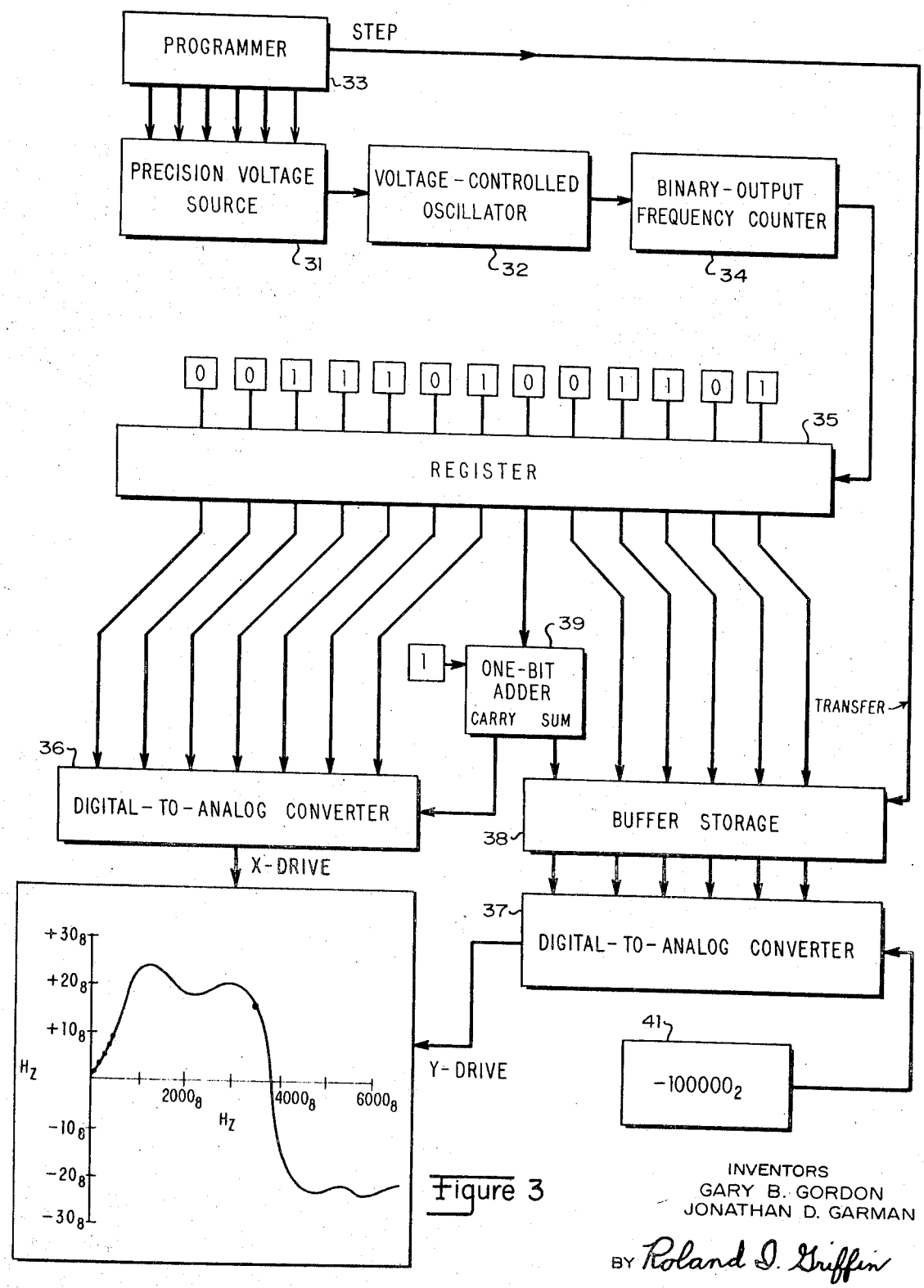
FIG. 3 is a block diagram of the novel calculator system operating with a binary coded system to produce a linearity plot for a voltage controlled oscillator.

Referring now to FIG. 3 there is disclosed a similar technique for plotting the linearity curve for a voltage control oscillator. In this system, the precision voltage source 31 for the voltage controlled oscillator 32 is controlled from the programmer 33 to move sequentially from one voltage value to the next to produce frequency outputs from the oscillator 32 at spaced-apart calibration intervals. A binary output frequency counter 34 supplies a binary value representing the actual frequency output of the oscillator 32 to the register 35. The actual frequency of oscillation of oscillator 32 as shown in the example on the digital display is $0011101001101_2$ Hz. For simplicity, this binary value which has been shown in the base 2 is $03515_8$ in the base 8. In this example, the assumptive frequency or the frequency that the voltage control oscillator should be producing is $0011101000000_2$ Hz. or, when stated in the base 8, $03500_8$ Hz.

The higher order binary digits are transmitted to he first digital-to-analog converter 36 while the lower order binary digits are transmitted to the second digital-to-analog converter 37 via the buffer storage circuit 38. The one bit adder circuit 39' operates similarly to the one digit adder circuit of FIG. 2 to provide a sum output to the buffer storage 38 and a carry output to the first digital-to-analog converter 36. The binary amount that is added digitally by the one bit adder 39 is subsequently subtracted analogously by the function box 41 in the digital-to-analog converter 37.

The mathematics for deriving the error frequency, shown in the base 8 for simplicity, is as follows:

$03515_8 - 03500_8$
$= 03515_8 - 03500_8 + 00040_8 - 00040_8$
$= 03555_8 - 03500_8 - 00040_8$
$= (03555_8 \text{ modulo } 100_8) - 00040_8$
$= +00015_8 \text{ (or } 001101_2)$ It should be noted that the general method is usable in some applications with only the Y or error signal generated. For example, a machine under calibration can be advanced to each new calibration point at 1 second intervals, and the error can be plotted on a strip chart recorder (for example, recorder 42 in FIG. 2) advancing paper at, for example, 1 graduation per second. Thus, by using time as the independent variable, the digital-to-analog converter 16 or 36 is no longer necessary.

While the present invention has been described with relation to the derivation and plotting of positioning errors of machine tools and linearity curves for a voltage controlled oscillator, it will be apparent to those skilled in the art that this invention may be applied to the measurement and calibration of like parameters of many other forms of precision instruments or devices. It should also be understood that the invention is applicable to all systems utilizing digital number calibration obtained, for example, from counters or digital voltmeters or other forms of digital transducers.

We claim:

1. A method for deriving an error value between a desired value and a measured value at each of a plurality of calibration points, said method comprising the steps of measuring the actual value at each calibration point, producing a digital value representing the measured value, converting the value represented by a plurality of higher order digits of the digital value to an analog value representing the desired value, and converting the value represented by a plurality of lower order digits of the digital value to an analog value representing the difference between the measured value represented by this plurality of lower order digits of the digital value and a predetermined value representing the value of a corresponding plurality of lower order digits of the desired value.

2. The method of claim 1 wherein the value represented by the plurality of higher order digits of the digital value is converted to an analog value representing the desired value nearest to the measured value, and wherein the predetermined value is zero.

3. The method of claim 1 wherein the error values are positioning errors in a machine tool, the desired values are assumptive distances of movement of the machine tool, and the measured values are measured actual distances of movement of the machine tool.

4. The method of claim 1 wherein the desired value is an integral multiple of the interval between calibration points, and the interval between calibration points is greater than twice the largest error value.

5. The method of claim 4 wherein the predetermined value is zero and the difference between the measured value represented by the plurality of lower order digits of the digital value and zero is the measured value plus one-half the interval between calibration points, modulo the interval between calibration points, reduced by one-half the interval between calibration points.

6. The method of claim 1 including the additional step of plotting the analog value representing the desired value along one axis of a graph and plotting the analog value representing the difference between the measured value represented by the plurality of lower order digits of the digital value and a predetermined value representing the value of a corresponding plurality of lower order digits of the desired value along a second axis of the graph.

7. A method for deriving an error value between a desired value and a measured value at each of a plurality of calibration points, said method comprising the steps of measuring the actual value at each calibration point, producing a digital value representing the measured value, and converting the value represented by a plurality of lower order digits of the digital value to an analog value representing the difference between the measured value represented by this plurality of lower order digits of the digital value and zero representing the value of a corresponding plurality of lower order digits of the desired value.

8. The method of claim 7 wherein the error values are positioning errors in a machine tool, the desired values are assumptive distances of movement of the machine tool, and the measured values are measured actual distances of movement of the machine tool.

9. The method of claim 7 wherein the error values are conversion errors in the digital output of an electronic instrument, the desired values are assumptive digital outputs of the instrument, and the measured values are measured actual digital outputs of the instrument.

10. The method of claim 7 wherein the desired value is an integral multiple of the interval between calibration points, and the interval between calibration points is greater than twice the largest error value.

11. The method of claim 10 wherein the difference between the measured value represented by the plurality of lower order digits of the digital value and zero is the measured value plus one-half the value of the interval between calibration points, modulo the value of the interval between calibration points, reduced by one-half the value of the interval between calibration points.

12. The method of claim 7 including the additional step of plotting the analog value representing the difference between the measured value represented by the plurality of lower order digits of the digital value and zero along an axis of a recorder.

13. A method for computing an error value between a desired value and an actual value of an operating parameter of a device successively at each of a plurality of calibration points separated by a calibration interval at least twice the maximum error value, said method comprising the steps of obtaining the actual value at each calibration point, producing a digital value representing the actual value at each calibration point, converting the value represented by a plurality of higher order digits of the digital value produced for each calibration point to an analog value representing the desired value at the calibration point, and converting the value represented by a plurality of lower order digits of the digital value produced for each calibration point to an analog value representing the difference between the actual value represented by the plurality of lower order digits of the digital value produced for the calibration point and zero representing the value of a corresponding plurality of lower order digits of the desired value at the calibration point, said difference being the actual value plus half the calibration interval, modulo the calibration interval, reduced by half the calibration interval.

14. The method of claim 13 wherein the error values are positioning errors in a machine tool, the desired values are assumptive distances of movement of the machine tool, and the actual values are actual measured distances of movement of the machine tool.

15. The method of claim 13 wherein the error values are conversion errors in the digital output of an electronic instrument, the desired values are assumptive digital outputs of the electronic instrument, and the actual values are actual digital outputs of the electronic instrument.

16. The method of claim 13 including the additional step of plotting the analog value representing the desired value at each calibration point along one axis of a graph and plotting the analog value representing the difference between the actual value represented by the plurality of lower order digits of the digital value produced for each calibration point and zero along a second axis of the graph.

17. The method of claim 13 including the additional step of plotting the analog value representing the difference between the actual value represented by the plurality of lower order digits of the digital value produced for each calibration point and zero along an axis of a recorder.

18. Apparatus for deriving an error value between a desired value and a measured value at each of a plurality of calibration points, said apparatus comprising means for measuring the actual value at each calibration point, means for producing a digital value representing the measured value, conversion means for converting the value represented by a plurality of higher order digits of the digital value to an analog value representing the desired value adjacent to the measured value, and conversion means for converting the value represented by a plurality of lower order digits of the digital value to an analog value representing the difference between the measured value represented by the plurality of lower order digits of the digital value and zero representing the value of a corresponding plurality of lower order digits of the desired value.

19. Apparatus as in claim 18 wherein the error values are positioning errors in a machine tool, the desired values are assumptive distances of movement of the machine tool, and the measured values are actual measured distances of movement of the machine tool.

20. Apparatus as in claim 18 wherein the error values are frequency output errors in a voltage controlled oscillator, the desired values are assumptive frequencies of operation of the oscillator, and the measured values are actual measured frequencies of operation of the oscillator.

21. Apparatus as in claim 18 wherein the desired value is an integral multiple of the interval between calibration points, and the interval between calibration points is greater than twice the largest error value.

22. Apparatus as in claim 21 wherein the difference between the measured value represented by the plurality of lower order digits of the digital value and zero is the measured value plus one-half the value between calibration points, modulo the value between calibration points, reduced by one-half the value between calibration points.

23. Apparatus as in claim 18 including means for plotting the analog value representing the desired value along one axis of a graph and the analog value representing the difference between the measured value represented by the plurality of lower order digits of the digital value and zero along a second axis of the graph.

24. Apparatus as in claim 18 including means for plotting the analog value representing the difference between the measured value represented by the plurality of lower order digits of the digital value and zero along an axis of a recorder.

25. Apparatus as in claim 18 wherein each of said conversion means comprises a digital-to-analog converter.

26. Apparatus for deriving an error value between a desired value and an actual value of an operating parameter of a device successively at each of a plurality of calibration points separated by a calibration interval at least twice the maximum error value, said apparatus comprising means for obtaining the actual value at each calibration point, means for producing a digital value representing the actual value at each calibration point, first computer means comprising a first digital-to-analog converter, means for transmitting a plurality of higher order digits of the digital value produced for each calibration point to the first computer means, said first computer means producing an analog output signal proportional to the desired value at each calibration point, second computer means comprising a second digital-to-analog converter, and means for transmitting a plurality of lower order digits of the digital value produced for each calibration point to the second computer means, said plurality of lower order digits representing a value smaller than half the value of the calibration interval, said second computer means producing an analog output signal proportional to the difference between the actual value represented by the plurality of lower order digits of the digital value produced for each calibration point and zero representing the value of a corresponding plurality of lower order digits of the desired value at each calibration point, said difference being the actual value plus half the calibration interval, modulo the calibration interval, reduced by half the calibration interval.

27. Apparatus as in claim 26 wherein the desired value at each calibration point is an integral multiple of the interval between calibration points, and the interval between calibration points is greater than twice the largest error value.

28. Apparatus as in claim 26 including plotting means coupled to both of said first and second computer means for plotting the analog output signals produced thereby.

29. Apparatus as in claim 26 wherein said second computer means further comprises means for digitally adding a fixed offset value to the first digit of said plurality of lower order digits, and means for thereafter subtracting said offset value from the analog output signal produced by said second computer means.

30. Apparatus as in claim 29 wherein said means for digitally adding a fixed offset value comprises a one digit adder to which said first digit of said plurality of lower order digits is transmitted, and means for transmitting said fixed offset value to said one digit adder.

31. Apparatus as in claim 26 including means for transmitting a calibration point signal between said apparatus and said device.

32. Apparatus for measuring a positioning error value between an assumptive position and an actual position of a machine tool successively at each of a plurality of calibration points separated by a calibration interval at least twice the maximum error value, said apparatus comprising a laser interferometer for measuring the actual value at each calibration point, means for producing a digital value representing the actual value at each calibration point, first computer means comprising a first digital-to-analog converter, means for transmitting a plurality of higher order digits of the digital value produced for each calibration point to the first computer means, said first computer means producing an analog output signal proportional to the desired value at each calibration point, second computer means comprising a second digital-to-analog converter, and means for transmitting a plurality of lower order digits of the digital value produced for each calibration point to the second computer means, said plurality of lower order digits representing a value smaller than half the value of the calibration interval, said second computer means producing an analog output signal proportional to the difference between the actual value represented by the plurality of lower order digits of the digital value produced for each calibration point and zero representing the value of a corresponding plurality of lower order digits of the desired value at each calibration point, said difference being the actual value plus half the calibration interval, modulo the calibration interval, reduced by half the calibration interval.

33. Apparatus as in claim 32 wherein the desired value at each calibration point is an integral multiple of the interval between calibration points, and the interval between calibration points is greater than twice the largest error value.

* * * * *